Figure 1:
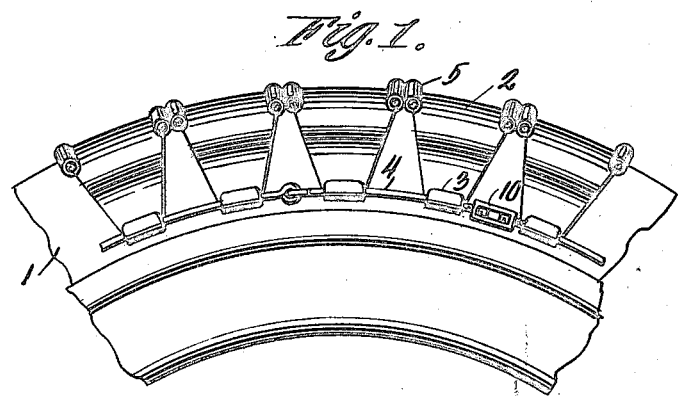

W. T. HOGUE.
TIRE SHIELD.
APPLICATION FILED OCT. 4, 1921.

1,436,102.

Patented Nov. 21, 1922.

WITNESSES

WILLIAM T. HOGUE Inventor

By Richard B. Owen Attorney

Patented Nov. 21, 1922.

1,436,102

UNITED STATES PATENT OFFICE.

WILLIAM T. HOGUE, OF ST. JAMES, MISSOURI.

TIRE SHIELD.

Application filed October 4, 1921. Serial No. 505,284.

*To all whom it may concern:*

Be it known that I, WILLIAM T. HOGUE, a citizen of the United States, residing at St. James, in the county of Phelps and State of Missouri, have invented certain new and useful Improvements in Tire Shields, of which the following is a specification.

The present invention relates to tire shields especially useful in connection with pneumatic tires and has for its principal object to provide a shield of this nature which will not only protect the tire from puncture but also will not in any way injure the same although allowing it to have its usual resiliency.

Another important object of the invention is to generally improve upon tire shields of this character by providing a device which will be of extremely simple, durable and inexpensive construction, one which is efficient and reliable in operation, and well adapted to the purpose for which it is designed.

With these and numerous other objects in view, the invention resides in certain novel features of construction, and the combination and arrangement of parts as will be hereinafter more fully described and claimed.

In the drawing:—

Figure 2:
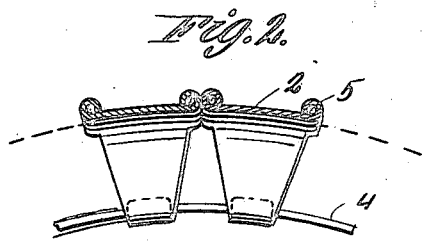
Figure 3:
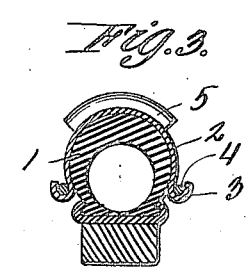

Figure 1 is a fragmentary elevation of a pneumatic tire with my invention thereon, Figure 2 is a longitudinal section therethrough, and Figure 3 is a transverse section therethrough.

Referring to the drawing in detail it will be seen that 1 designates a pneumatic tire of any preferred construction. My shield which is placed over the tire consists of a plurality of plates which are curved so as to conform to the peripheral curvature of the tire. It should be noted that the ends of each plate are tapered and terminate in the hooks 3 for receiving the longitudinal retaining members 4. It is also to be noted that the edges of the plate 2 adjacent the central portion of the tire or the tread thereof are curved over upon the body so as to form the rolled lips 5. By curving the edges of the plates 2 as just described adjacent the tread of the tire it will be seen that the guard will be prevented from cutting into the tire as would be the case if the bare edge was allowed to be exposed. This is true because of the fact that the tire is resilient and in passing over a roadway will naturally be pressed inwardly when in engagement with the ground because of the weight of the vehicle whereby the edges of the shield would be forced into engagement with the tread.

It will be readily understood that minor changes in form, and the construction and arrangement of parts of my shield can be made and substituted for those herein shown and described, without departing from the spirit of my invention as herein claimed.

Having thus described my invention what I claim as new is:

A tire shield comprising a plurality of guard plates, each of which is provided with a pair of curved edges one on each side thereof said edges being curved over upon the plate adjacent its tread thereby forming anti-skid cleats, said guard plates being so arranged that said curved edges will abut each other, and means for holding the tire shield in engagement with a tire.

In testimony whereof I affix my signature in presence of two witnesses.

WILLIAM T. HOGUE.

Witnesses:
NORMAN E. JOHNSON,
JOHN STRACK.